United States Patent [19]

Sluzky et al.

[11] Patent Number: 5,140,449
[45] Date of Patent: Aug. 18, 1992

[54] LIQUID CRYSTAL LIGHT VALVE IN COMBINATION WITH A CATHODE RAY TUBE CONTAINING A FAR-RED EMITTING DOUBLE-ACTIVATED YTTRIUM ALUMINUM GARNET PHOSPHOR

[75] Inventors: Esther Sluzky, Encinitas; Mary A. Lemoine, Oceanside; Kenneth R. Hesse, Escondido, all of Calif.

[73] Assignee: Hughes Aircraft Company, Los Angeles, Calif.

[21] Appl. No.: 828,100

[22] Filed: Jan. 30, 1992

Related U.S. Application Data

[62] Division of Ser. No. 708,551, May 31, 1991, abandoned.

[51] Int. Cl.$^5$ .............. G02F 1/1335; G02F 1/135; C09K 11/80
[52] U.S. Cl. .............. 359/50; 252/301.4 R; 340/794; 340/795; 359/72; 313/468
[58] Field of Search .............. 252/301.4 R; 359/50, 359/72; 340/794, 795; 313/467, 648

[56] References Cited

U.S. PATENT DOCUMENTS

| | | | |
|---|---|---|---|
| 3,591,517 | 7/1971 | Van Der Ziel et al. | 252/301.4 R |
| 3,725,811 | 4/1973 | Murphy | 252/301.4 R |
| 3,956,170 | 5/1976 | Weber | 252/301.4 R |
| 4,799,050 | 1/1989 | Prince et al. | 359/50 |
| 4,806,825 | 2/1989 | Catherall | 252/301.4 R |
| 4,925,276 | 5/1990 | McMurray et al. | 359/72 |
| 5,009,490 | 4/1991 | Kouro et al. | 359/72 |
| 5,084,777 | 1/1992 | Slobodin | 359/72 |

*Primary Examiner*—Jack Cooper
*Attorney, Agent, or Firm*—Jeannette M. Walder; Terje Gudmestad; Wanda K. Denson-Low

[57] ABSTRACT

A doubly activated yttriuim aluminum garnet (YAG) phosphor, activated with both europium and chromium, is provided. The concentration of Eu ranges from about 1 to 5 at %, while the concentration of Cr ranges from about 0.1 to 1 at %. The YAG:Eu,Cr phosphor has a line spectrum which more closely matches the spectral sensitivity of amorphous silicon liquid crystal light valves thereby, providing more efficient use of the available energy.

3 Claims, 3 Drawing Sheets

LIQUID CRYSTAL LIGHT VALVE IN COMBINATION WITH A CATHODE RAY TUBE CONTAINING A FAR-RED EMITTING DOUBLE-ACTIVATED YTTRIUM ALUMINUM GARNET PHOSPHOR

This is a division of application Ser. No. 708,551, filed May 31, 1991, now abandoned.

BACKGROUND OF THE INVENTION

1. Field of the Invention

The present invention relates to phosphors used in cathode ray tubes for liquid crystal displays, and, more particularly, to yttrium aluminum garnet phosphors.

2. Description of Related Art

Phosphors used for addressing the amorphous-silicon in the Hughes liquid crystal light valve (LCLV) must meet the following conditions:

Spectral output as closely matched to the amorphous silicon ($\alpha$-Si) response as possible;

Maximum radiant energy output in the spectral range of interest;

Decay time less than approximately 10 milliseconds measured from 100% to 10% levels;

Average particle size suitable for high resolution operation—less than about 6 $\mu$m; and High resistance to either thermal or life-induced degradation.

The spectral responsivity of $\alpha$-silicon used in the LCLV peaks at about 740 nm. Consequently, for optimum sensitivity, the incoming light which is used to activate the $\alpha$-silicon photosensitive layer should provide as close a match to the responsivity curve as possible.

Many phosphors have been investigated in an attempt to find a phosphor having the correct characteristics in regard to spectral emission, decay time, efficiency, and small particle size. Such other phosphors include aluminum oxide:Cr, cadmium sulfide:Ag, zinc cadmium sulfide:Ag, zinc phosphate:Mn, yttrium oxysulfide:Eu, yttrium aluminum oxide:Eu, etc.

One existing far-red phosphor (by "far-red" is meant about 600 to 800 nm) used in luminescent lamps demonstrates a very close match to the $\alpha$-silicon responsivity. It consists of a lithium aluminum oxide activated with iron ($LiAlO_2$:Fe). In the commercially available material, the iron concentration is about 0.5%. However, this phosphor, when used in CRTs, has a much longer decay time than can be tolerated, approximately 30 ms.

Yttrium aluminum garnet (YAG) phosphors are well-known in the art. They have various activators such as terbium, cerium, europium, and the like. In YAG:Eu, the energy is distributed between the 591, 608, 630, and 710 nm lines, with lesser peaks at about 649 and 692 nm. Because of this spectral output, this phosphor does not efficiently turn on the light valve.

No commercially available phosphors have been found to satisfy the $\alpha$-silicon LCLV requirements.

SUMMARY OF THE INVENTION

In accordance with the invention, a doubly activated yttrium aluminum garnet phosphor is provided, employing europium and chromium. The introduction of the chromium activator along with europium shifts the major portion of the energy to begin at about 675 nm and extending beyond 750 nm, with substantial peaks at 692 and 710 nm. This provides a much closer match to the $\alpha$-silicon responsivity curve and provides more efficient use of the available energy. Consequently, resolution is improved since less beam current can be used, thereby decreasing the electron beam diameter.

BRIEF DESCRIPTION OF THE DRAWINGS

FIG. 4: Eu=1%, Cr=0.125%; FIG. 5: Eu=1%, Cr=0.25%; FIG. 6: Eu=5% Cr=0.125%)

DESCRIPTION OF THE PREFERRED EMBODIMENTS

Figure 1:
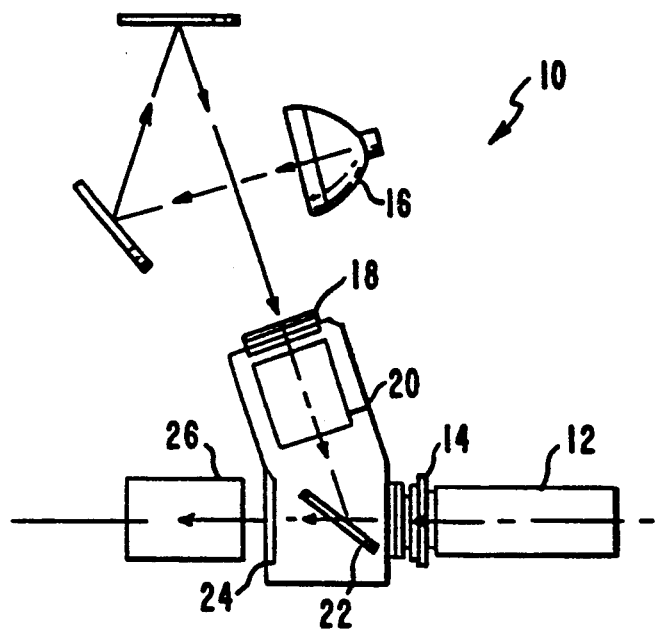
FIG. 1 is a schematic diagram of a liquid crystal light valve projector system, employing a cathode ray tube.

A liquid crystal light valve (LCLV) is described in, for example, SID International Symposium, Digest of Technical Papers, "Video-Rate Liquid Crystal Light-Valve Using an Amorphous Silicon Photoconductor" R. D. Sterling et al, Vol XXI, pp. 327–328 (1990). FIG. 1, which is taken from that reference, is a schematic diagram of a basic LCLV projector 10, comprising a cathode ray tube (CRT) 12, which provides an input image which is coupled to a liquid crystal light valve 14, typically through a fused fiber optic faceplate (not shown). A xenon arc lamp 16 provides the output light, which is filtered by UV filter 18 and linearly polarized by pre-polarizer filter 20 before reaching the LCLV 14. The image then passes through a polarizing mirror 22, a prism wedged window 24, and then through a projection lens 26, where it is projected onto a screen (not shown).

The foregoing projector is an example of apparatus employing a combination of the LCLV and CRT. Other combinations of LCLVs and CRTs are also known. While such combinations are known to those skilled in the art, none of the CRTs disclosed uses as a phosphor the phosphor of the invention.

Figure 2:
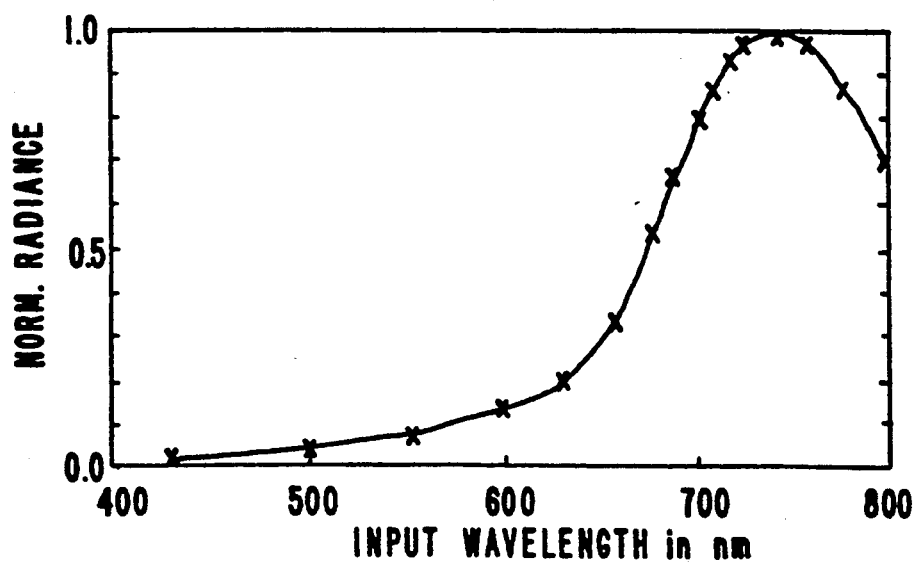
FIG. 2, on coordinates of normalized radiance and wavelength in nanometers, is a plot of the spectral response of an amorphous silicon ($\alpha$-Si) photoconductor.

The LCLV employs a hydrogenated amorphous silicon photoconductor ($\alpha$-Si:H), as is well-known and as is shown in the afore-mentioned reference. The spectral response of $\alpha$-Si photoconductor is depicted in FIG. 2. It is this curve to which a phosphor must be as closely matched as possible for efficient energy coupling.

Figure 3:
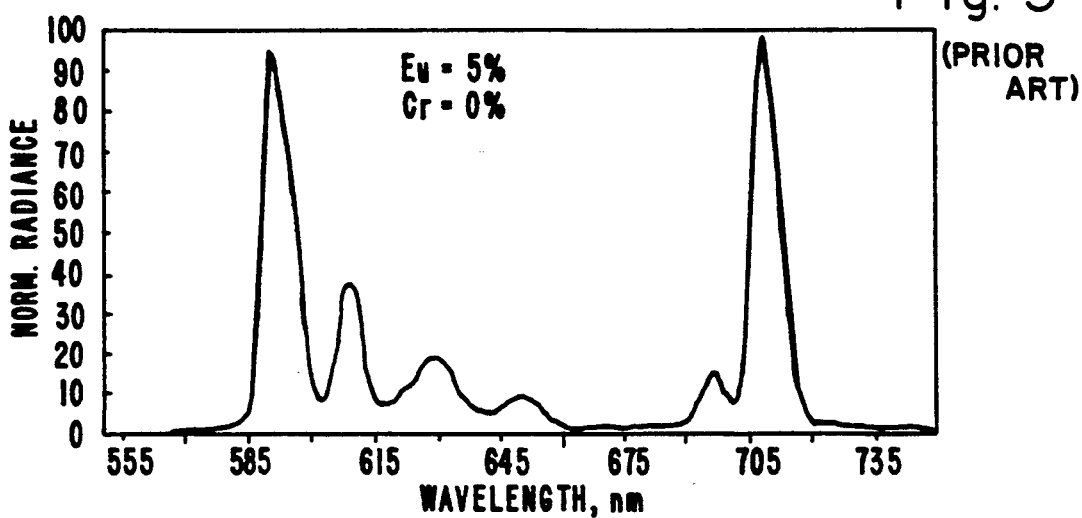
FIGS. 3–6, on coordinates of normalized radiance and wavelength in nanometers, are plots of light output of YAG:Eu,Cr phosphors at different concentrations of europium and chromium content (FIG. 3: Eu=5%, Cr=0%.
Figure 4:
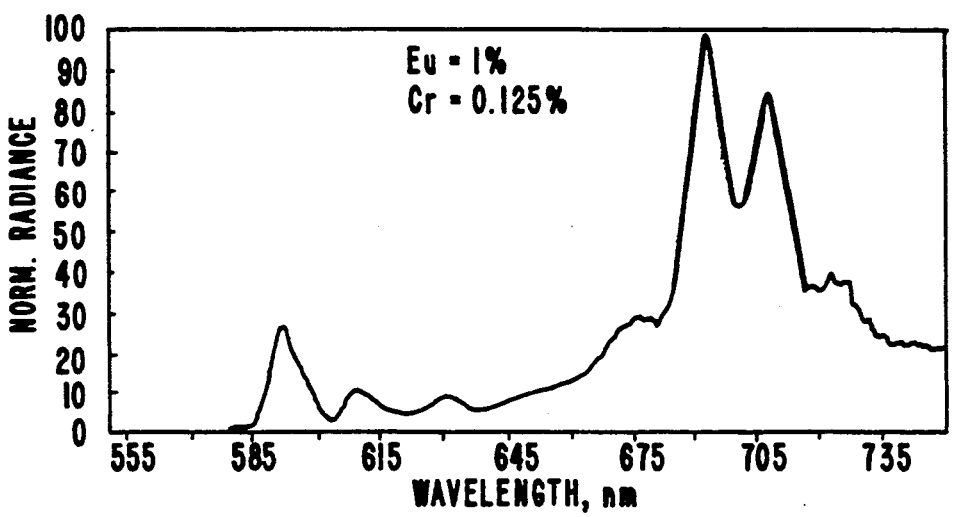
Figure 5:
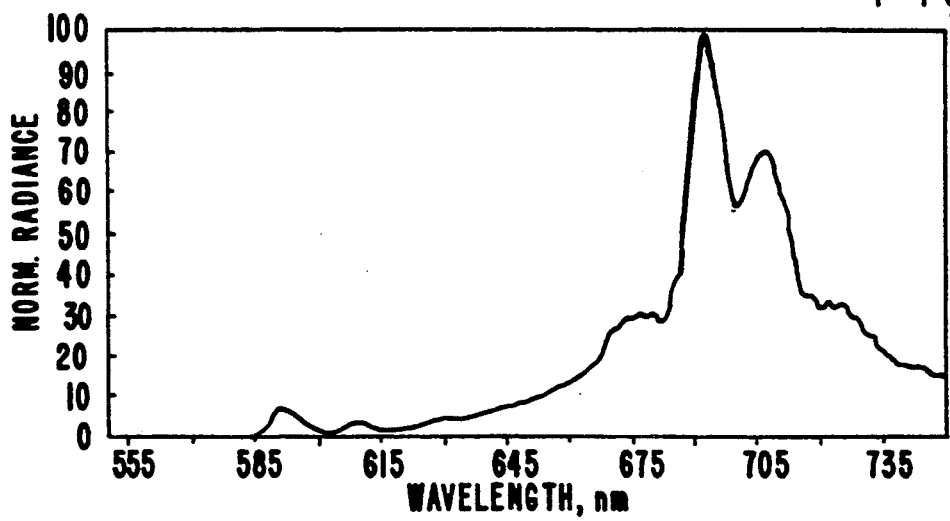
Figure 6:
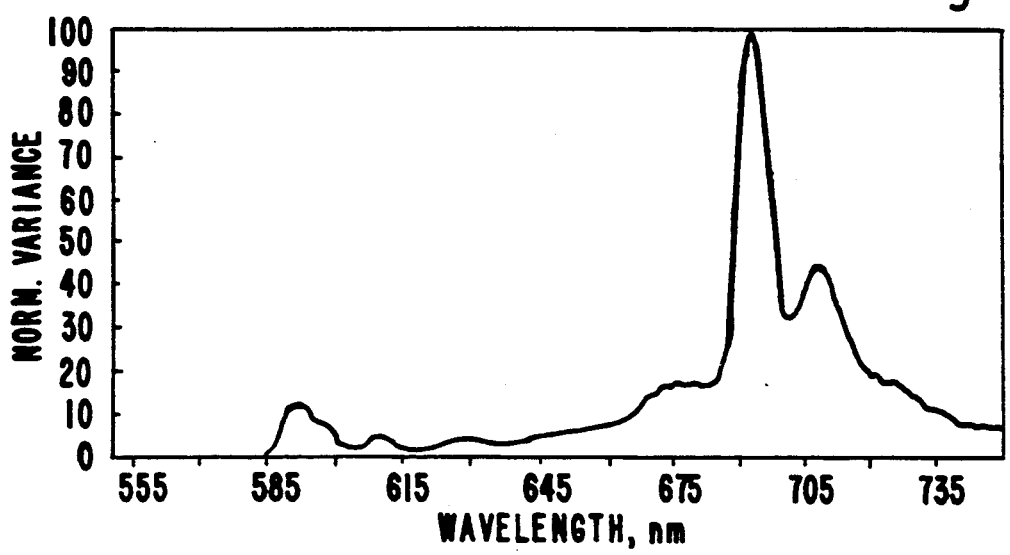

When YAG is activated with europium, the typical europium line spectrum is produced. As seen in FIG. 3, it consists mainly of five major lines situated at $\approx$591 nm (1), 711 (2), 611 (3), 696 (4), and 630 (5). The number in parentheses indicate the relative order of intensity, 1 being the brightest. This spectrum, and the ones which follow, may be compared with the spectrum of $\alpha$-Si, shown in FIG. 2.

When chromium is added as an extra activator, the relative brightness of these lines is changed drastically, shifting more of the energy into the higher wavelength lines as follows: 692 nm (1), 710 (2), 725 (3), 591 (4), 611 (5), and 630 (6). In addition, there is also a band spectrum produced which starts at ≈645 nm and extends out to beyond 750 nm.

Thus, when chromium is added to the material and properly incorporated into the crystal structure, the amount of energy in the 692 and 710 nm lines is increased with respect to the others, which diminish substantially in output. Consequently, since this more closely matches the silicon response curve, the light valve operates more efficiently.

The europium concentration varies from about 1 to 5 at %, as is conventional in these phosphors. The chromium concentration influence starts becoming appreciable at about 0.1 at %. The more chromium, the greater the output of the 692 and 710 lines. FIGS. 3–6 show this energy transfer to the 692 and 710 nm lines as a function of the Cr content.

Preferably, the europium concentration ranges from about 1 to 5 at %, while the Cr concentration ranges from about 0.1 to 1.0 at %. Most preferably, the Cr concentration is about 0.25 wt %.

YAG:Eu,Cr is conveniently made by a solid state reaction. Starting materials consist of the oxides of yttrium, aluminum, europium, and chromium. These are mixed in stoichiometric proportions and ball milled to produce a wellblended homogeneous mixture. After milling and drying the reactants, they are fired in a one-step process, typically about 1,500° 1,600° C. for about 2 to 8 hours in an oxidizing atmosphere, such as air.

Alternately, the oxides can be fired in a two-step process, typically about 1,200° C. for 1 to 4 hours, followed by firing at about 1,500° to 1,600° C. for about 2 to 8 hours, again in an oxidizing atmosphere, such as air.

Both of these procedures are well-known in the art and thus form no part of this invention.

Since the screen resolution depends upon the particle size of the phosphor, the firing must accommodate the production of particles having an average particle size of less than about 6 μm.

A sol-gel process can also be employed for producing the phosphor. Starting components in this case consist of either the nitrates or chlorides of Y, Al, Eu, and Cr. These are dissolved in deionized water in stoichiometric proportions. The next step is to precipitate the hydroxides of all the metals by adding a solution of ammonium hydroxide in excess to that required for stoichiometry. After suitable digestion and stabilization of the precipitate, it is filtered off, washed thoroughly, and dried The above firing operations can then be used on this starting material to yield the desired phosphor. Again, such processes are known and do not form a part of this invention.

A typical method of producing a YAG formulation phosphor according to the teachings of the present invention is now described. This two-step method itself is not considered novel, and forms no part of this invention.

Assuming that it is desired to produce 10 g of phosphor starting with oxide components, the required amount (see the formulations below) of oxides are placed into a two-ounce ball mill with about 30 g of sintered alumina balls having a diameter of approximately 9 mm. Fifteen ml of deionized water is added and the mill is closed and placed on the rollers. Producing greater amounts of the phosphor would require appropriate scale-up, as is well-known.

After rolling for two hours, during which time the oxides are intimately mixed and their sizes somewhat reduced, the mill is removed from the rolls and the contents dumped into a clean receptacle. Rinse water from the mill is added to the main dump charge. After drying in an oven at approximately 110° C., the powder is sieved through 70 stainless steel mesh. This is placed into a sintered alumina boat and loaded into the furnace at 400° C. The temperature is raised to 1,200° C. and held there for two hours. At the end of this time, the temperature is lowered to 400° C., at which time the boat is removed from the furnace. The furnace atmosphere conveniently is air during the firing operations. The material is sieved again, and the particle size is measured. The material is then placed back in the furnace, and the temperature is raised to 1,600° C. and held there for two hours. The furnace is cooled to 400° C. and the boat removed. This final material is crushed in a mortar with a pestle, sieved, measured for particle size, and is ready for use.

The following shows the starting material weights for the preferred composition:

| | |
|---|---|
| $Y_2O_3$ | 3.353 g |
| $Eu_2O_3$ | 0.0528 g (1 at %) |
| $Al_2O_3$ | 2.55 g |
| $Cr_2O_3$ | 0.023 g (0.25 at %). |

Figure 7:
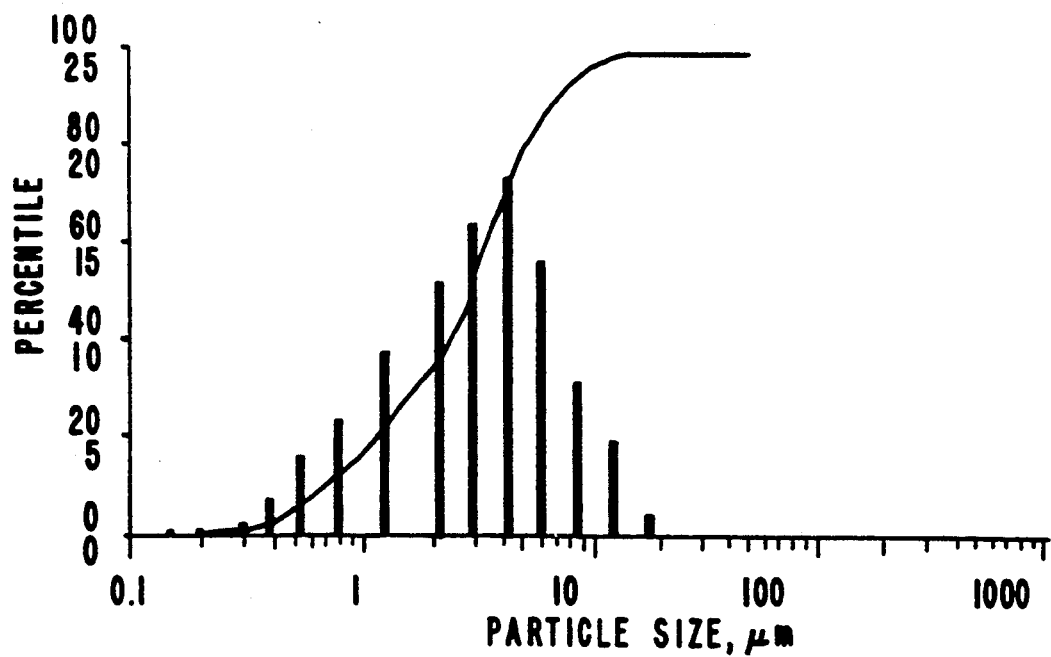
FIG. 7, on coordinates of percentile and particle size in micrometers, is a plot of the particle size distribution for a typical preparation of the phosphor of the invention.

The particle size distribution for a phosphor having the preferred composition and prepared as described above is shown in FIG. 7. The average particle size is 3.56 μm, with 10% of the particles less than 0.80 μm and 10% of the phosphate:Mn, yttrium oxysulfide:Eu, yttrium aluminum ox particles greater than 9.04 μm.

Thus, there has been disclosed a far-red emitting phosphor, consisting essentially of YAG:Eu, Cr. Various changes and modifications of an obvious nature will be readily apparent to those of ordinary skill in this art, and all such changes and modifications are considered to fall within the ambit of the invention, as defined by the appended claims.

What is claimed is:

1. In combination, a liquid crystal light valve including a photosensitive layer consisting essentially of a hydrogenated α-silicon photoconductor and a cathode ray tube containing a far-red emitting phosphor operatively coupled thereto, characterized in that said phosphor consists essentially of yttrium aluminum garnet activated with about 1 to 5 at % europium ions and about 0.1 to 1 at % chromium ions, based on the total cation concentration.

2. The combination of claim 1 wherein the amount of chromium ions is about 0.25 at %.

3. The combination of claim 1 wherein said phosphor has an average particle size of less than about 6 μm.

* * * * *